United States Patent [19]

Egan

[11] Patent Number: 6,015,176

[45] Date of Patent: Jan. 18, 2000

[54] KIT FOR MOUNTING A PICKUP BOX ON A TRUCK FRAME

[76] Inventor: James E. Egan, 106 Steko Ave., Rochester, N.Y. 14615

[21] Appl. No.: 09/274,165

[22] Filed: Mar. 22, 1999

[51] Int. Cl.[7] .................................................. B62D 27/04
[52] U.S. Cl. .............................................................. 296/35.1
[58] Field of Search ............................................. 296/35.1

[56] References Cited

U.S. PATENT DOCUMENTS

| | | | |
|---|---|---|---|
| 1,552,702 | 9/1925 | Irish | 296/35.1 |
| 2,867,472 | 1/1959 | Harper | 296/35.1 |
| 4,634,168 | 1/1987 | Fuchs et al. | 296/35.1 |

*Primary Examiner*—Gary C. Hoge
*Attorney, Agent, or Firm*—Howard J. Greenwald

[57] ABSTRACT

A kit for installing a pickup box onto the frame of a chassis cab which contains a first bracket, a second bracket, a third bracket, a fourth bracket, a fifth bracket, and a sixth bracket. Each of the first two brackets has a substantially rectangular shape. Each of the third and fourth brackets is substantially L-shaped. Each of the fifth and sixth brackets has a substantially rectangular shape and contains an offset leg extending from one side thereof.

8 Claims, 4 Drawing Sheets

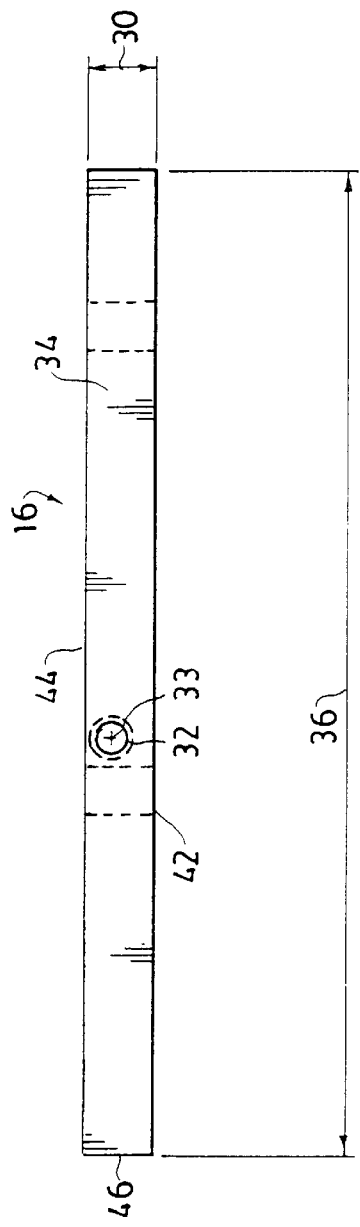
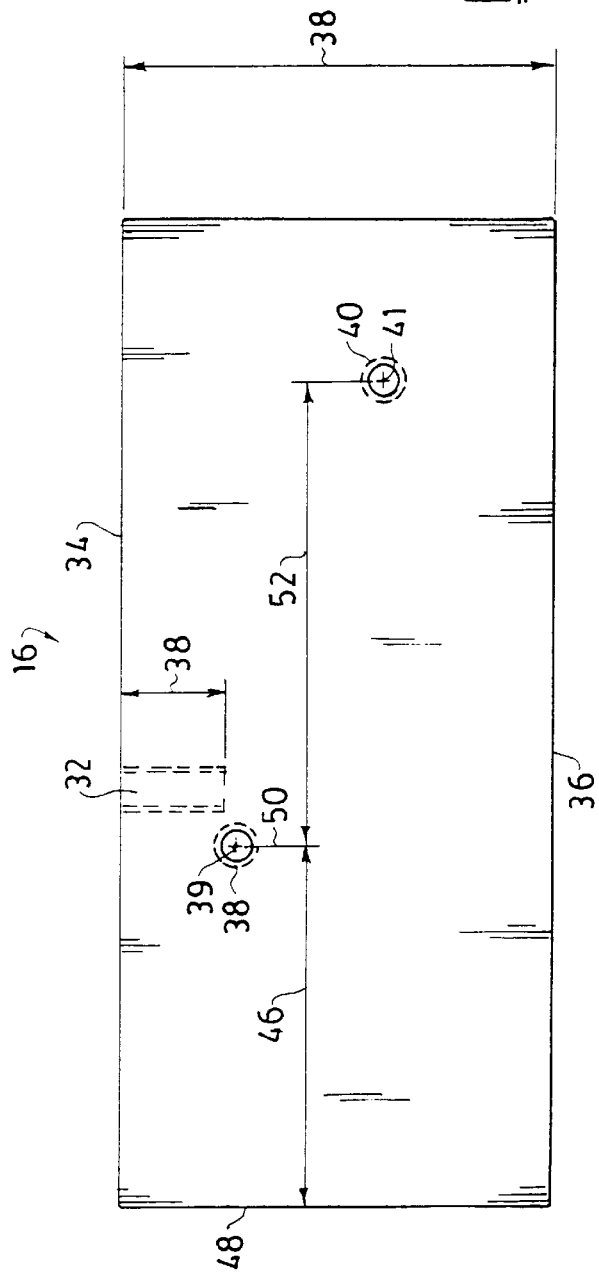

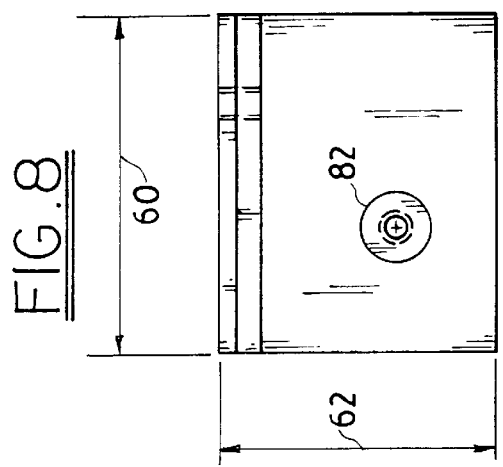
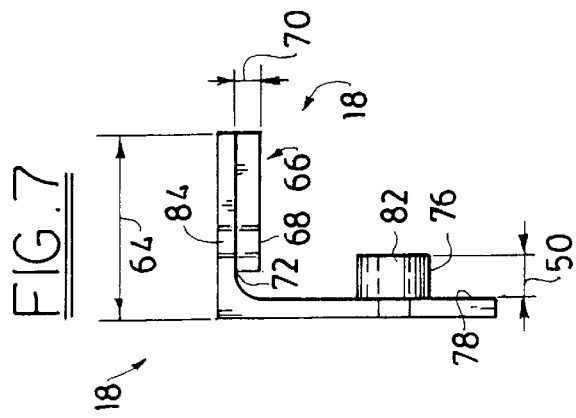
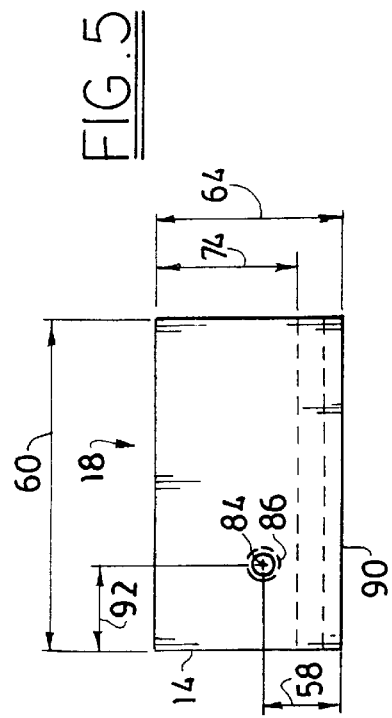
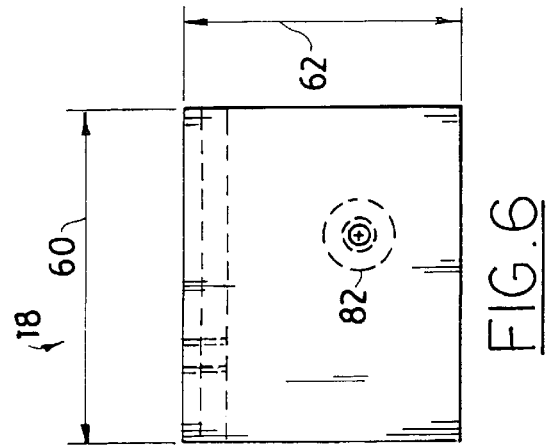

KIT FOR MOUNTING A PICKUP BOX ON A TRUCK FRAME

FIELD OF THE INVENTION

A kit for installing a pickup box onto the frame of truck, such as a cab and chassis truck.

BACKGROUND OF THE INVENTION

Some motor vehicles are sold as "chassis cab" vehicles. As is known to those in the art, they are incomplete vehicles, each with a completed occupant compartment (the "cab"), that require only the addition of cargo-carrying, work-performing, or load-bearing components to perform their intended functions. See, e.g., U.S. Pat. Nos. 5,791,681 and 5,746,441, the entire disclosures of which are hereby incorporated by reference into this specification.

One particular type of chassis cab vehicle which is very popular is sold by the Ford Motor Company of Dearborn, Mich. as the "Super Duty Chassis Cab" and, in particular, as the "Super Duty F-350 Chassis Cab," the "Super Duty F-450 Chassis Cab," and the "Super-Duty F-550 Chassis Cab." These vehicles are described, e.g., in a Ford publication entitled "1999 Super Duty F-Series" identified as "304- Ann. Litho in U.S.A. 3/98." In the remainder of this specification, these vehicles will be referred to as the "Super Duty Chassis Cab."

The Ford "Super Duty Chassis Cab" is an incomplete vehicle. Most chassis cabs, which are also incomplete, may be completed by the addition of, e.g., a cargo-carrying component such as, e.g., a pickup box. Pickup boxes for use with such chassis cabs are well known to those skilled in the art and are described, e.g., in U.S. Pat. Nos. 5,865,495, 5,862,926, 5,800,106, 4,288,188, 5,0114,890, 5,338,136, 4,083,312, Des. 289,698, 4,818,162, 5,799,849, 5,730,486, 5,636,893, 5,603,439, 5,582,048, 5,575,525, 5,566,963, 5,556,152, 5,544,932, 5,512,848, 5,492,259, 5,486,031, 5,445,482, 5,427,487, 5,405,226, 5,385,377, 5,3350,271, and the like. The disclosure of each of these United States patents is hereby incorporated by reference into this specification.

By way of further illustration, Scherer Truck Equipment, Inc. of 2670 Auburn Road, Auburn Hills, Mich. sells and installs a "Super Duty Tower (SDT)" pickup body for the Ford Super Duty chassis cabs. No installation kit is currently available for the installation of the Scherer pickup body, and Scherer does not allow anyone besides itself to install such pickup bodies; it is believed that the accessories used to install the Scherer pickup body are substantially different than applicant's system, but applicant is not sure of their configurations.

By way of yet further illustration, the Fontaine Modification Company of 11400 Westport Road, Louisville, Ky. sells a "Classic Traveler Bed" for installation on the Ford Superduty 350, 450, and 550 Cab Chassis. Fontaine is the only one allowed to install this system, and it is not known what accessories they use in such installation; however, it is not believed that such accessories are structurally similar to applicant's installation kit.

To, to the best of applicant's knowledge, the commercially available pickup boxes cannot readily be mounted to the Ford Super Duty Chassis Cab trucks; substantial modification of the chassis cabs is required to install the pickup boxes. It does not appear that there is any available kit which allows one to readily mount a conventional pickup box onto the chassis of such trucks.

It is an object of this invention to provide a kit for the mounting of a pickup box onto a Ford Super Duty Chassis Cab truck so that, once the pickup box is installed, a strong, safe, and durable structure is produced.

It is another object of this invention to provide an installation kit for the mounting of a pickup box onto a truck chassis which can be bolted to such chassis.

SUMMARY OF THE INVENTION

In accordance with this invention, there is provided a kit for installing a pickup box onto the chassis of a truck comprising six brackets of specified dimensions and properties.

BRIEF DESCRIPTION OF THE DRAWINGS

The invention will be described by reference to the following drawings, in which like numerals refer to like elements, and in which:

FIG. 3 is a top view of a bracket indicated as 4—4 in FIG. 2;

FIG. 4 is the side view of the bracket of FIG. 3;

FIG. 5 is a top view of a bracket indicated as 6—6 in FIG. 2;

FIG. 6 is a front side view of the bracket of FIG. 5;

FIG. 7 is a front view of the bracket of FIG. 5;

FIG. 8 is a back side view of the bracket of FIG. 5;

DESCRIPTION OF THE PREFERRED EMBODIMENTS

Figure 1:
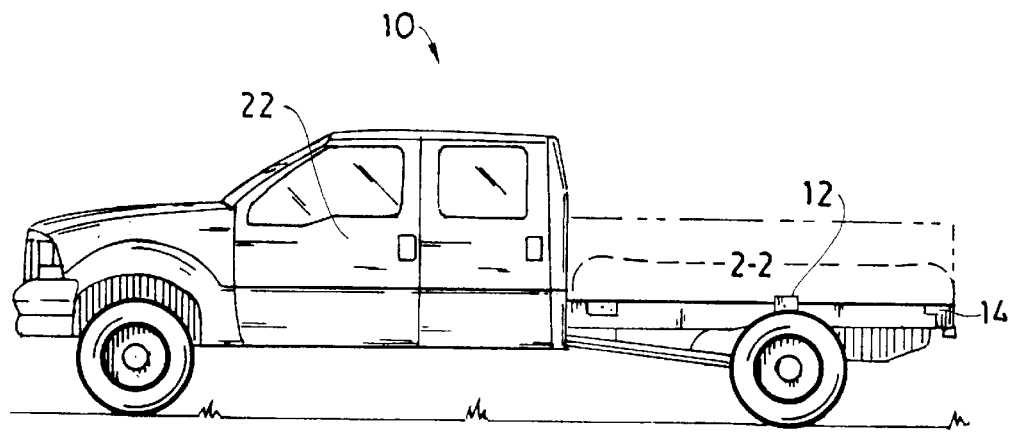
FIG. 1 is a side view of a chassis cab truck with the installation kit of this invention attached to it.

FIG. 1 is a side view of a chassis cab 10 which, preferably, is a model F-350, F-450, or F-550 "Super Duty Chassis Cab" manufactured by the Ford Motor Company. These vehicles have a "gross vehicle weight rating" of from about 15,000 to about 17,500 pounds and, thus, are especially useful in towing heavy loads. Because of the size, aesthetics, and capabilities of these vehicles, they can be used for both commercial and non-commercial purposes.

In the embodiment depicted in FIG. 1, a kit 12 is attached to the chassis 14 of chassis cab 10. This kit 12 allows one to advantageously and readily mount a pickup box (not shown) onto chassis 14.

One preferred pickup box which may be mounted with kit 12 is identified as "SUPER DUTY F-250/350 STYLESIDE PICKUP BOX," which is manufactured by the Ford Motor Company of Dearborn, Mich. This pickup box is described in the "F Super Duty Body Builder's Layout Guide" published by Ford Motor Company of Dearborn, Mich.; this publication, as well as the "Ford Truck Source Book" (which has vehicle specifications) is published by the Ford Motor Company, Education and Training Department, 300 Renaissance Center, P.O. Box 43334, Detroit, Mich. 48243. This pickup box is 8.0 feet long, and it has a width of from about 80 to about 96 inches.

Figure 2:
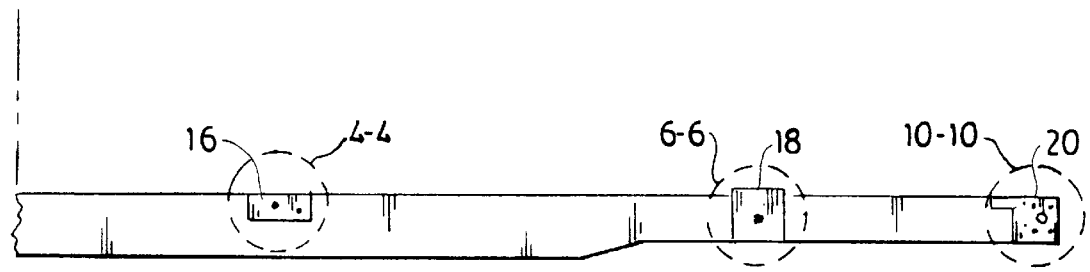
FIG. 2 is a partial side view of the installation kit of FIG. 1.

FIG. 2 is a partial side view of the installed kit 12 of FIG. 1. Referring to FIG. 2, it will be seen that kit 12 is comprised of bracket 16, bracket 18, and bracket 20 installed on the driver's side 22 of the chassis 14, and a corresponding bracket 16' (not shown), 18' (not shown), and 20' (not shown) installed on the passenger's side 22' (not shown) of the chassis 14.

FIG. 3 is a top view of bracket 16, and FIG. 4 is a side view of such bracket 16. This bracket 16 preferably is made from cold rolled steel and, most preferably, is made from 12L14 cold rolled steel.

Referring to FIGS. 3 and 4, it will be seen that bracket 16 has a thickness 30 of at least 0.8 inches (and preferably from about 0.9 to about 1.1 inches) and is comprised of a drilled and tapped hole 32 preferably adapted to receive a bolt (not shown). Hole 32 preferably extends from the top 34 of bracket 16 towards its bottom 36 and preferably has a depth 38 of at least about 0.9 inches and, more preferably, a depth of at least about 1.0 inch. In one preferred embodiment, hole 32 has a depth of 1.5 inches, is drilled with a 0.531" drill, and a ⅝–11 bottom tap 1.0" thread depth minimum. The distance from the centerline 33 of hole 32 to side 44 of bracket 16 is from about 0.38 to about 0.42 inches.

The length of bracket 16 preferably is from about 13.9 to about 14.2 inches. The width 38 of bracket 16 is from about 5.9 to about 6.2 inches.

Bracket 16 is comprised of holes 38 and 40 which extend from side 42 to side 44 of bracket 16. The distance 46 from the end 48 of bracket 16 to the centerline 39 of hole 38 is from about 6.38 to about 6.42 inches. The vertical distance 50 between centerline 39 and centerline 41 of hole 40 is from about 2.01 to about 2.05 inches. The horizontal distance 52 from the center of hole 40 to centerline 39 is from about 6.58 to 6.62 inches.

FIG. 5 is a top view of bracket 18, and FIG. 6 is a side view of bracket 18. FIG. 7 is a front view of bracket 18. FIG. 8 is a back side view of bracket 18.

Bracket 18 preferably is made angle steel with a thickness of from 0.355 to about 0.395 inches which preferably has been cold rolled.

Referring to FIGS. 5, 6, 7, and 8, it will be seen that bracket 18 has a length 60 of from about 7.05 to about 7.45 inches, a width 62 of from about 5.98 to about 6.02 inches, and a width 64 of of section 66 of from about 3.98 to about 4.02 inches. In the preferred embodiment depicted in FIGS. 5, 6, 7, and 8, a block of steel 68 with a thickness 70 of from about 0.54 to about 0.59 inches is welded to bottom surface 72 of bracket 18. Steel block 68 has a length 60, and it has a width 74 (see FIG. 5) of from about 2.98 to about 3.02 inches.

Referring again to FIGS. 5, 6, 7, and 8, it will be seen that a steel spacer 76 is preferably welded to the back 78 of bracket 18. This steel spacer 76 preferably has a substantially circular cross section with a thickness 80 of from about 0.98 to about 1.02 inches. A hole 82 is drilled through the spacer 76 and the back wall 78 of bracket 18. This hole preferably is drilled with a ²¹⁄₃₂" drill bracket 18 and spacer 76, and then it is tapped through with a ¾" by 10 threaded tap hole.

Referring again to FIGS. 5, 6, 7, and 8, it will be seen that hole 84 extends through bracket 18 and spacer 68 (see FIG. 7). This hole 84 preferably is a ¹⁷⁄₃₂" diameter drilled through hole with a ⅝"×11 threaded tap hole. The center 86 is preferably at a distance 88 from wall 90, and a distance 92 from wall 94, of bracket 18. Distance 88 is preferably from about 1.68 to about 1.88 inches, and distance 92 is preferably from about 1.72 to about 1.94 inches.

Figure 11:
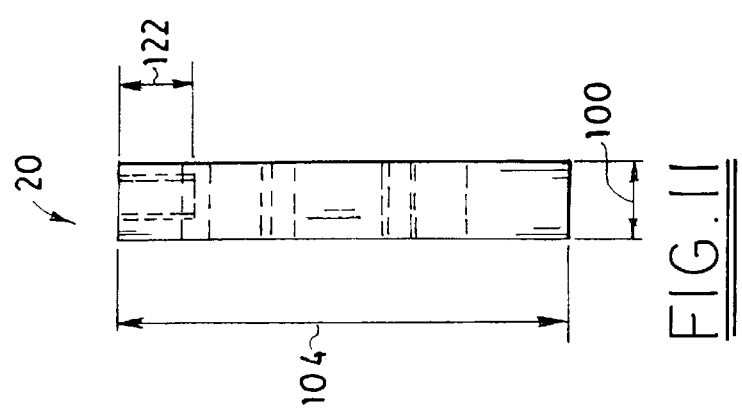
FIG. 11 is an end view of the bracket of FIG. 9.
Figure 9:
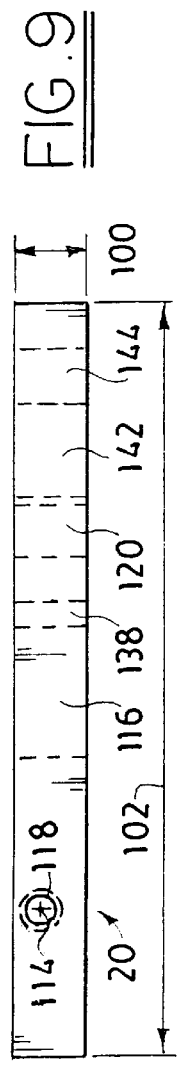
FIG. 9 is a top view of a bracket indicated as 10—10 in FIG. 2.
Figure 10:
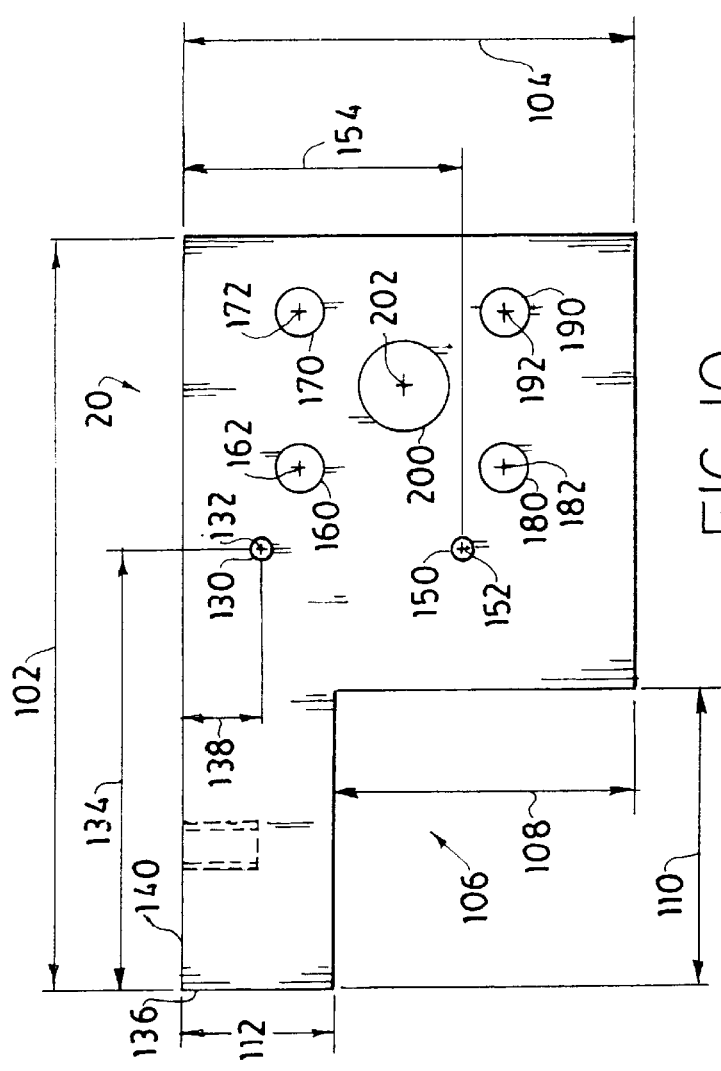
FIG. 10 is a side view of the bracket of FIG. 9.

FIGS. 9, 10, and 11 are a top view, a side view, and an end view, respectively, or bracket 20. Bracket 20 is preferably made from cold rolled steel like, e.g., the cold rolled steel 12L14 described hereinabove.

Referring to FIGS. 9, 10, and 11, it will be seen that bracket 20 has a width 100 of from about 0.98 to about 1.02 inches, a major length 102 of from about 9.98 to about 10.02 inches, and a major height 104 of from about 5.98 to about 6.02 inches. The bracket 20 is comprised of an L-shaped portion 106 with a height 108 of from about 7.98 to about 8.02 inches, a length 110 of from about 3.98 to about 4.02 inches, and width 112 of from about 1.98 to about 2.02 inches.

A hole 114 is drilled in the top surface 116 of bracket 20 so that the center 118 of hole 114 is at a distance from of 0.398 to about 0.402 inches from the back surface 120 of bracket 20. The hole 114 preferably extends a distance 122 into bracket 20. Hole 114 preferably has a diameter of ¹⁷⁄₃₂", distance 122 is preferably from about 0.980 to about 1.02 inches, and hole 114 has a depth of 1.5 inches, is drilled with a 0.531" drill, and a ⅝–11 bottom tap 1.0" thread depth minimum.

Referring again to FIGS. 9, 10, and 11, hole 130 is comprised of a center 132 which is disposed a distance 134 from wall 136 and a distance 138 from wall 140. Distance 134 is from about 5.68 to about to about 1.06 inches, and distance 138 is from about 1.02 to about 1.06 inches. Hole 130 extends from wall 142 to wall 144 (see FIG. 9). Hole 130 preferably has a diameter of from about 0.355 to about 0.395 inches.

Referring again to FIGS. 9, 10, and 11, hole 150 is comprised of a center 152 which is disposed a distance 134 from wall 136 and a distance 154 from wall 140. Distance 134 is from about 5.68 to about to about 1.06 inches, and distance 154 is from about 3.49 to about 3.89 inches. Hole 150 extends from wall 142 to wall 144 (see FIG. 9). Hole 130 preferably has a diameter of from about 0.355 to about 0.395 inches.

Referring again to FIGS. 9, 10, and 11, hole 160 is comprised of a center 162 which is disposed a distance from wall 136 of from about 6.77 to about 6.99 inches, and is also disposed at a distance from wall 140 of from about 1.36 inches to about 1.76 inches. Hole 160 extends from wall 142 to wall 144 (see FIG. 9). Hole 130 preferably has a diameter of from about 0.667 to about 0.707 inches.

Referring again to FIGS. 9, 10, and 11, hole 170 is comprised of a center 172 which is disposed a distance from wall 136 of from about 6.77 to about 6.99 inches, and is also disposed at a distance from wall 140 of from about 9.01 to about 9.05 inches. Hole 170 extends from wall 142 to wall 144 (see FIG. 9). Hole 170 preferably has a diameter of from about 0.667 to about 0.707 inches. Referring again to FIGS. 9, 10, and 11, hole 170 is comprised of a center 172 which is disposed a distance from wall 136 of from about 6.77 to about 6.99 inches, and is also disposed at a distance from wall 140 of from about 9.01 to about 9.05 inches. Hole 170 extends from wall 142 to wall 144 (see FIG. 9). Hole 170 preferably has a diameter of from about 0.667 to about 0.707 inches.

Referring again to FIGS. 9, 10, and 11, hole 180 is comprised of a center 182 which is disposed a distance from wall 136 of from about 6.77 to about 6.99 inches, and is also disposed at a distance from wall 140 of from about 4.24 to about 4.28 inches. Hole 180 extends from wall 142 to wall 144 (see FIG. 9). Hole 180 preferably has a diameter of from about 0.667 to about 0.707 inches.

Referring again to FIGS. 9, 10, and 11, hole 190 is comprised of a center 192 which is disposed a distance from wall 136 of from about 9.01 to about 9.05 inches, and is also disposed at a distance from wall 140 of from about 1.54 to about 1.58 inches. Hole 170 extends from wall 142 to wall 144 (see FIG. 9). Hole 170 preferably has a diameter of from about 0.667 to about 0.707 inches.

Referring again to FIGS. 9, 10, and 11, hole 200 is comprised of a center 202 which is disposed a distance from wall 136 of from about 8.03 to about 8.07 inches, and is also disposed at a distance from wall 140 of from about 2.92 to about 2.96 inches. Hole 200 extends from wall 142 to wall 144 (see FIG. 9). Hole 200 preferably has a diameter of from about 1.23 to about 1.27 inches.

Despite the apparent simplicity of applicant's design, it has met with a substantial amount of commercial success. Because of the critical nature of the dimensions and configuration of applicant's brackets, applicant's installation kit has worked substantially better for its intended purpose than any comparable prior art device.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A kit for installing a pickup box onto the frame of a chassis cab, wherein said kit is comprised of a first bracket, a second bracket, a third bracket, a fourth bracket, a fifth bracket, and a sixth bracket, and wherein:
   (a) each of said first bracket and said second bracket has a substantially rectangular shape, a front wall, a back wall, a top wall, a bottom wall, a left wall, a right wall, a thickness of at least about 0.8 inches, a length of from about 13.9 to about 14.2 inches, and a width of from about 5.9 to about 6.2 inches, wherein:
      1. disposed between said front wall and said back wall, and extending from said top wall towards said bottom wall, is a downwardly extending first hole with a depth of at least about 0.9 inched, wherein the center of said first hole is disposed from about 0.38 to about 0.42 inches from said back wall,
      2. extending through said front wall to said back wall is a second hole with a center which is disposed from 6.38 to about 6.42 inches from said left wall and about 2.01 to about 2.05 inches from said top wall,
      3. extending from said front wall to said back wall is a third hole with a center which is disposed from about 12.98 to about 13.02 inches from said left wall and from about 3.69 to about 3.73 inches from said top wall,
   (b) each of said third bracket and said fourth bracket is substantially L-shaped and is comprised of a first leg integrally joined to a second leg, wherein:
      1. said first leg has a front surface, a back surface, a a thickness of from about 0.355 to about 0.395 inches, a height of from about 5.98 to about 6.02 inches, and a width of from about 7.05 to about 7.45 inches, wherein a steel spacer is welded to said back surface of said first leg, wherein:
         (a) said steel spacer has a thickness of from about about 0.98 to about 1.02 inches, and
         (b) a hole is disposed through said steel spacer and said first leg, p2 2. said second leg has a top surface, a bottom surface, a thickness of from about 0.355 to about 0.395 inches, a length of form about 3.98 to about 4.02 inches, and a width of from about 7.05 to about 7.45 inches, wherein a steel spacing block is attached to said bottom surface of said second leg, wherein said steel spacing block has a thickness of from about 0.54 to about 0.59 inches, a width of from about 2.98 to about 3.02 inches, and a length of from about 7.05 to about 7.45 inches, and wherein a hole extends from said top surface of said second leg through said steel spacing block, and
   (c) each of said fifth and sixth brackets is comprised of a left side, a right side, a top surface, a front surface, and a back surface, has a substantially rectangular shape, and is comprised of an offset leg extending from said left side thereof, wherein:
      1. each of said fifth sixth brackets has an overall length of from 9.98 to about 10.02 inches, and overall width of from about 5.98 to about 6.02 inches, and a thickness of from about 0.98 to about 1.02 inches,
      2. said offset leg has an length of from 3.98 to about 4.02 inches, a width of from about 1.98 to about 2.02 inches, and a thickness of from about 0.98 to about 1.02 inches,
      3. a hole is disposed in said top surface and extends downwardly within said top surface for a distance of from about 0.98 to about 1.02 inches,
      4. seven holes extend from said front surface of each of said fifth and sixth brackets to said back surface of each of said fifth and sixth brackets.

2. The kit as recited in claim 1, wherein each of said first bracket and said second bracket is made from cold rolled steel.

3. The kit as recited in claim 2, wherein said cold rolled steel is 12L14 cold rolled steel.

4. The kit as recited in claim 3, wherein each of said third and fourth brackets is made from angle steel.

5. The kit as recited in claim 4, wherein each of said third and fourth brackets is made from cold rolled angle steel.

6. The kit as recited in claim 5, wherein said steel spacer has a substantially circular cross-section.

7. The kit as recited in claim 6, wherein each of said fifth and sixth brackets is made from cold rolled steel.

8. The kit as recited in claim 7, wherein said cold rolled steel is 12L14 steel.

* * * * *